US008738180B2

(12) United States Patent
Shi et al.

(10) Patent No.: US 8,738,180 B2
(45) Date of Patent: May 27, 2014

(54) ROBOT CONTROL DURING AN E-STOP EVENT

(75) Inventors: Jianying Shi, Oakland Township, MI (US); David Groll, Rochester Hills, MI (US); Peter W. Tavora, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 337 days.

(21) Appl. No.: 13/325,140

(22) Filed: Dec. 14, 2011

(65) Prior Publication Data

US 2013/0158709 A1 Jun. 20, 2013

(51) Int. Cl.
*G05B 15/00* (2006.01)
*G05B 19/00* (2006.01)

(52) U.S. Cl.
USPC ........... 700/259; 700/245; 700/258; 700/255; 700/253

(58) Field of Classification Search
USPC .................................................. 700/245–264
See application file for complete search history.

*Primary Examiner* — Bhavesh V Amin
(74) *Attorney, Agent, or Firm* — Quinn Law Group, PLLC

(57) ABSTRACT

A system for a work cell having a carrier that moves a product along an assembly line includes an assembly robot, sensor, and controller. An arm of the robot moves on the platform adjacent to the carrier. The sensor measures a changing position of the carrier and encodes the changing position as a position signal. The controller receives the position signal and calculates a lag value of the robot with respect to the carrier using the position signal. The controller detects a requested e-stop of the carrier when the arm and product are in mutual contact, and selectively transmits a speed signal to the robot to cause a calibrated deceleration of the platform before executing the e-stop event. This occurs only when the calculated tracking position lag value is above a calibrated threshold. A method is also disclosed for using the above system in the work cell.

19 Claims, 3 Drawing Sheets

ROBOT CONTROL DURING AN E-STOP EVENT

TECHNICAL FIELD

The present disclosure relates to the control of a robot during an emergency stop (e-stop) event in a moving robotic assembly line.

BACKGROUND

The movement of work product through different assembly stations or work cells has led to dramatic improvements in production yield and efficiency. Some robot-assisted assembly lines convey a product to the different work cells via an overhead or an underbody carrier, and then stop the product at a particular cell. Robots may perform assigned work tasks before the line is restarted. In other assembly line configurations, the robot may track assembly line motion and perform automated tasks on the moving product.

The synchronized motion of a moving assembly line presents unique control challenges. For instance, the robot's motion must be sufficiently coordinated with the motion of the assembly line, e.g., a particular carrier which transports the work piece to the different stations or cells in the plant. Once proper alignment is achieved between the robot and the work piece, and once the robotic assembly task commences, the robot and to-be-assembled work piece are in mutual contact. In this contact phase of control, the robot's motion is controlled as a function of the contact forces between the end of arm/end effector of the robot and the product.

Moving robotic assembly lines are also equipped with a host of safety devices such as pressure mats, gates, light curtains, manual stop buttons, and other emergency stop (e-stop) devices. Typically, triggering of an e-stop event immediately stops the robot. However, if an e-stop event occurs during the contact phase of control, the disruption of synchronized motion between the robot and the product may be abrupt. In some instances this disruption can lead to a collision between end effector and product, and as a result, an undesirable, albeit transient, impact force on the product and robot end effector.

SUMMARY

A system is disclosed herein for minimizing and evaluating contact forces to a product in a plant, particularly during an emergency stop (e-stop) event in the contact phase of robotic control. An assembly robot has an end of arm tool/end effector in mutual contact with the product on a carrier during the contact phase of assembly. The carrier moves the product through the plant as noted above, e.g., the product is positioned on the carrier such that carrier pins align with mating holes or other features of the product. When an e-stop event is active, the assembly robot is controlled in a particular manner as set forth herein to minimize contact forces acting on the product.

In particular, a system is disclosed for use in a work cell having a carrier that moves a product along an assembly line. The system includes an assembly robot, a tracking sensor, and a controller. The assembly robot has a robotic arm and a moveable platform. The robotic arm moves on the platform adjacent to the carrier via a motor. The sensor measures a changing position of the carrier and encodes the changing position as a position signal. The controller is in communication with the assembly robot and the tracking sensor, and thus receives the position signal from the tracking sensor.

The controller then calculates a lag value of the assembly robot with respect to the carrier, doing so as a function of the position signal. The controller also detects a requested e-stop of the assembly robot when the robotic arm and the product are in mutual contact, and selectively transmits a speed signal to the motor. Upon receipt of the speed signal, the motor decelerates the platform at a calibrated rate while stopping the carrier. This occurs only when the calculated tracking position lag value is above a calibrated threshold.

A method is also disclosed for use in the work cell. The method includes moving a robotic arm of an assembly robot on a moveable platform that is positioned adjacent to the carrier, and measuring a changing position of the carrier using a tracking sensor. The method further includes encoding the changing position as a position signal, transmitting the position signal to a controller, and calculating a lag value of the assembly robot via the controller with respect to the carrier as a function of the position signal. Additionally, the method includes detecting a requested e-stop of the assembly robot when the arm and the product are in mutual contact, and selectively transmitting a speed signal from the controller to the assembly robot only when the calculated tracking position lag value is above a calibrated threshold. The speed signal causes a calibrated deceleration of the platform to occur.

The above features and advantages and other features and advantages of the present invention are readily apparent from the following detailed description of the best modes for carrying out the invention when taken in connection with the accompanying drawings.

DETAILED DESCRIPTION

Figure 1:
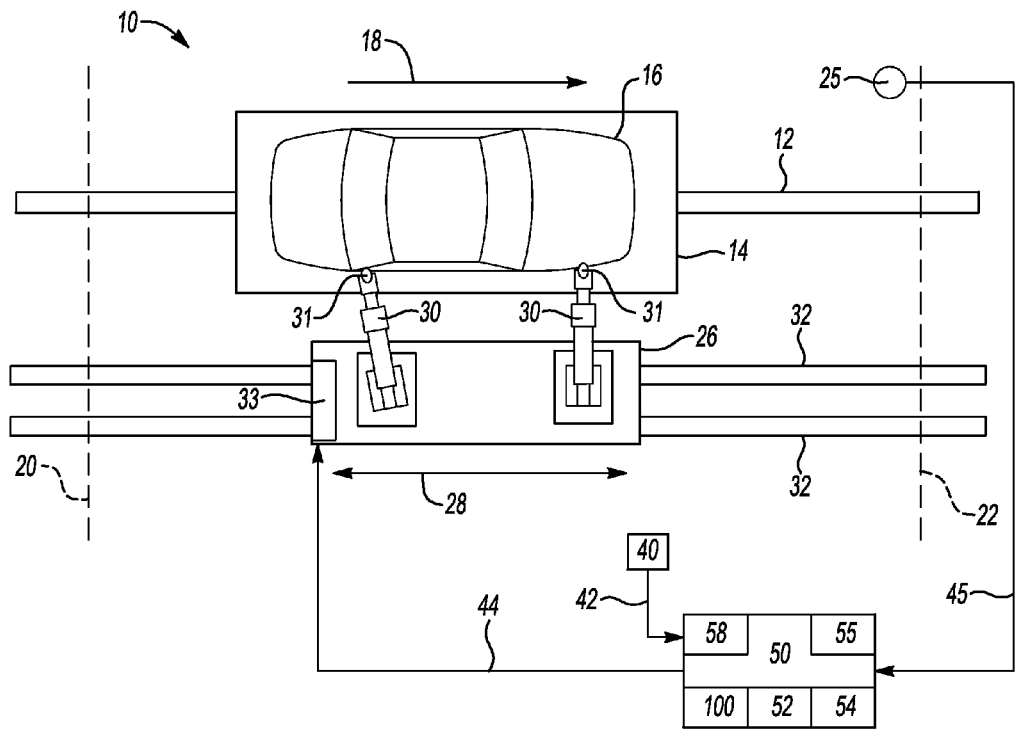
FIG. 1 is a schematic illustration of an example work cell having a controller which minimizes contact forces between a robot and a product during an emergency stop (e-stop) event.

Referring to the drawings wherein like reference numbers correspond to like or similar components throughout the several figures, and beginning with FIG. 1, a work cell 10 includes a conveyor line 12. A product 16 is transported through the work cell 10 via a carrier 14 in the direction of arrow 18. The product 16 is operated on by an assembly robot 30 during a contact phase of assembly. As noted above, the contact phase refers to the particular control phase in which motion of the robot 30 is controlled as a function of contact forces between an end of arm tool/end effector 31 of the robot 30 and the product 16.

A platform 26 travels adjacent to the conveyor line 12, e.g., on rails 32 which run alongside, above, below, or otherwise adjacent to the conveyor line 12. The rails 32 may run substantially parallel to the conveyor line 12. While omitted for simplicity, substantially identical rails 32 may be located on the other side of the conveyor line 12 to perform similar work tasks on the opposite side of the product 16. The rails 32 may include a motor 33 which engages the rails 32 or any other suitable drive mechanism which causes the platform 26 to translate along the rails 32 in the directions indicated by double headed arrow 28. In another embodiment, the platform 26 may be maintained on an autonomous vehicle with or without connection to the rails 32.

The structure of the conveyor line 12 and the rails 32 may vary with the particular embodiment and intended use. For instance, the conveyor line 12 and/or the rails 32 may be configured as a floor-mounted or overhead rail, track, slot, or any other structure which guides the carrier 14 and the platform 26 in a controlled manner in the direction of arrow 18. The work cell 10 has a length defined by respective start/stop boundaries 20, 22. Thus, the carrier 14 effectively enters the work cell 10 when it crosses boundary 20 and exits the work cell 10 when it crosses boundary 22.

An emergency stop (e-stop) event may be triggered by an e-stop device 40 at any time, including during the contact phase in work cell 10. E-stop events occurring during the contact phase can introduce substantial impulsive contact forces to the product 16. Such contact forces are due largely to the abruptly broken synchronized motion between the carrier 14 and platform 26. In other words, any physically engaged components of the robot 30 and the product 16 at the moment an e-stop event is triggered will tend to oppose each other, and thus cause a potentially large reactive contact force to occur at their engaged surfaces.

Figure 2:
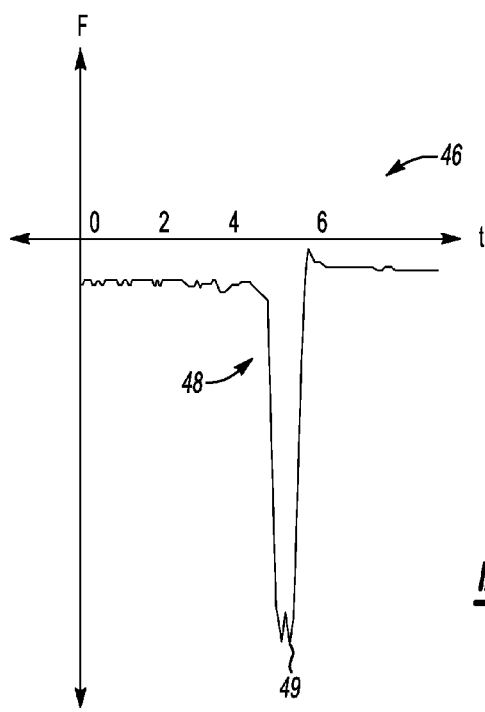
FIG. 2 is a time plot of example reactive contact forces during an e-stop event.

Referring briefly to FIG. 2, a trace 46 describes possible impulsive/reactive contact forces during an example e-stop event, with time (t) plotted on the horizontal axis and the impact force plotted on the vertical axis. From t=0 to t=5, a nominal level of force is present between the end effector 31 and the product 16 shown in FIG. 1, for instance a required force for holding the end effector 31 in contact with a lug nut on a vehicle tire. An e-stop event occurring at t=5 abruptly stops the assembly robot(s) 30 and/or the conveyor line 12 of FIG. 1, thus resulting in a spike 48 having a peak at approximately point 49. The peak in some instances may be as much as ten times the nominal level of force. Such a spike may cause the product 16 of FIG. 1 to become unstable on the carrier 14, and/or may damage a portion of the product 16, such as the threads of a wheel lug in keeping with the above example.

Figure 3:
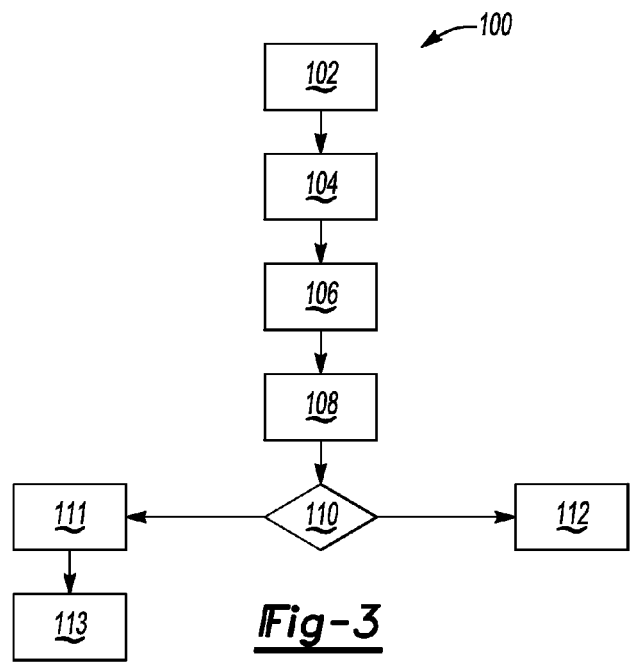
FIG. 3 is a flow chart describing an example method for handling an e-stop event in the work cell of FIG. 1.

Referring again to FIG. 1, a controller 50 is therefore used in the work cell 10 to reduce the peak impact force during an e-stop event in the contact phase of control. The controller 50 is in communication with the assembly robot 30, and is configured to execute instructions embodying a control method 100. An example method 100 is shown in FIG. 3 and described below. Execution of the present method 100 controls the motion of the platform 26 in a particular manner during a detected e-stop event to thereby minimize the likelihood of damage to the product 16, as well as to the robot 30.

The controller 50 may be configured as a host machine or a server having a central processing unit (CPU) 52 and memory 54, the latter of which may include tangible/non-transitory memory on which is recorded the instructions which embody the present method 100. Memory 54 may include, for instance, magnetic read only memory (ROM), electric random access memory (RAM), electrically-erasable programmable read-only memory (EEPROM), flash memory, etc. The controller 50 may also include circuitry including but not limited to a high-speed clock, analog-to-digital (A/D) circuitry, digital-to-analog (D/A) circuitry, a digital signal processor, and any necessary input/output (I/O) devices and other signal conditioning and/or buffer circuitry.

The controller 50 may include a receiver 55 in electrical/signals communication with a tracking sensor 25.

The controller 50 may also include an optional modeling module 58 which estimates contact forces for various scenarios, and then evaluates the effects on the product 16 of these forces. For instance, the modeling module 58 may model the effect on static equilibrium of the product 16 of FIG. 1 with respect to the carrier 14 using the estimated contact forces, and/or may model the effect on rotation of the product 16 with respect to the carrier 14 using the estimated contact forces. Likewise, the modeling module 58 may be used to model the effects on structural integrity of the product 16 of any contact with the product 16. Example evaluations performed by the modeling module 58 or offline are described below with reference to FIGS. 5 and 6.

The tracking sensor 25 may be positioned with respect to the conveyor line 12. Such a tracking sensor 25 measures the changing position of the carrier 14 and the product 16. The sensor 25 may be an electro-optical device such as a camera, although other sensor embodiments may be used without departing from the intended inventive scope. The sensor 25 encodes the measured position as a position signal (arrow 45) and transmits the measured position signal (arrow 45) to the controller 50. Thus, the controller 50 is able to determine the changing position of the carrier 14 in the cell 10, and thus its speed, by processing the position signals (arrow 45) as received from the sensor 25.

The controller 50 is also in communication with the e-stop device 40. The e-stop device 40 may be an e-stop button, a light curtain, a pressure mat, a gate, or any other device which manually or automatically signals that the robot 30 should quickly stop. Other conditions may trigger an e-stop event, for instance the detected presence of an object in the path of line 12 and/or the rail 32. Regardless of how the e-stop event is triggered, the e-stop device 40 transmits an e-stop signal (arrow 42) to the controller 50. The e-stop signal (arrow 42) and the position signal (arrow 45) are received by the receiver 55 and processed by the CPU 52 during execution of the method 100. Control signals (arrow 44) are then transmitted by the controller 50 to the motor 33 or other actuator to control the speed and deceleration of the platform 26 in the manner set forth below.

Referring to FIG. 3, an example method 100 is described with reference to the structure described above with reference to FIG. 1. Beginning at step 102, the controller 50 receives and processes the position signals (arrow 45) as transmitted by the tracking sensor 25, and then records the values communicated by the position signals (arrow 45) in memory 54. The method 100 proceeds to step 104 after recording the values from the position signals (arrow 45).

At step 104, the controller 50 calculates an instantaneous line speed (V) and its moving average ($V_a$) of the carrier 14 over a calibrated interval. The method 100 then proceeds to step 106.

At step 106, the controller 50 next calculates the required control signals (arrow 44) for speed control of the motor 33, with such speed control producing substantially synchronized motion of the platform 26 and the conveyor line 12. Specifically, step 106 includes transmitting to the motor 33, via the control signals (arrow 44), a speed command which causes the platform 26 to move at the calculated moving average line speed ($V_a$) determined at step 104. This helps to smooth the motion of the platform 26 without causing significant position lag in step 108 below.

At step 108, the controller 50 of FIG. 1 calculates an instantaneous tracking position lag value ($\Delta x$) for each control loop, e.g., once every 2 ms, using:

$$\Delta x = \int (V - V_a) dt$$

At step 110, the controller 50 determines if a set of conditions is satisfied. In particular, the controller 50 checks whether an e-stop event is active, which is known from receipt of e-stop signal (arrow 42), and whether the instantaneous tracking position lag value (Δx) exceeds a calibrated lag threshold. The controller 50 proceeds to step 111 only if both conditions are satisfied. Otherwise, the controller 50 proceeds to step 112.

At step 111, the controller 50 may control the linear rail motor 33 with a calibrated line speed profile. This speed imparts a predetermined deceleration profile to the motor 33. The calibrated line speed profile may be determined experimentally and recorded in memory 54 of the controller 50. The speed profile may be executed with assistance by any suitable means, such as electromagnetic, torque, and/or friction braking. Alternatively, drive power to motor 33 may be interrupted, such as by tripping a power switch to break the power feed to the rail motor 33, thus causing the platform 26 to decelerate in its natural state without braking. The e-stop signal (arrow 42) is then transmitted to the carrier 14. The method 100 proceeds to step 112.

At step 112, the controller 50 calculates an instantaneous speed adjustment, $J^{-1}\Delta x$, for each control loop for the end effector 31. As understood in the art, $J^{-1}$ is the inverse Jacobian matrix that is a function of the various mechanical links and joint angles of the robot 30. This value is transmitted as part of the control signals (arrow 44).

The present method 100 should be used in conjunction with a vigorous evaluation process to determine the maximum allowable contact forces for the particular product being assembled. Since the size, materials, and mass of the product 16 of FIG. 1 may vary by design along with the particular means for conveying the product 16 through the work cell 10, proper evaluation of the effects of contact forces may help improve the design of product 16 as well as the manner in which the product 16 is moved through the work cell 10 and operated on by the assembly robot 30.

Figure 4:
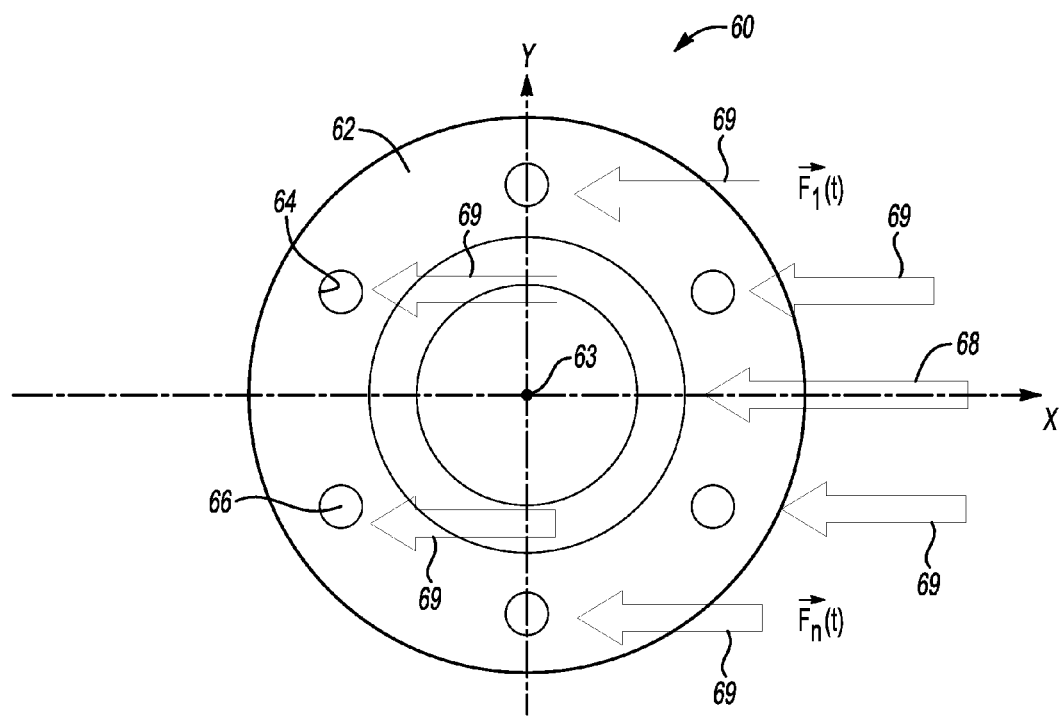
FIG. 4 is an example wheel hub showing equally distributed contact forces.

An example hub 60 is shown in FIG. 4 to illustrate some possible evaluation steps for use with method 100. The hub 60 may be a portion of a wheel for a vehicle, or any other hub having a hub flange 62 which defines a set of holes 64. Threaded bolts 66 are passed through the holes 64 during installation. An e-stop event occurring when the end effector 31 of FIG. 1 is in contact with material of the hub 60 can produce a substantial contact force. Depending on the distribution of the holes 64 with respect to a center point 63 of the hub 60, the contact force (arrow 68) may be distributed equally (arrows 69) or unequally among the various holes 64, and ultimately to the threaded bolt 66 contained in each of the holes 64.

Individual contact force at each independent contact point may be difficult to measure. However, the summarized energy (δ) may be experimentally measured, and the contact forces thereafter estimated for each contact surface by assuming an equal distribution. In equal distribution, the summarized energy (δ) may be approximated as:

$$\delta = \sum_i \int_{t_2}^{t_1} \vec{F}_i(t) dt \quad (1)$$

The individual forces may then be analyzed as needed, for instance with respect to force distribution within a given hole 64 and the effects of this force on the particular thread pattern of a bolt (not shown) contained therein.

For instance, one may evaluate whether the threaded stud is plastically deformed after the impact, i.e., the stud has suffered a global permanent structural change, or whether the thread surface has become locally deformed, i.e., a local permanent structural change. For the initial evaluation, estimation may be simplified by assuming the stud is a solid cylinder that is rigidly attached to the hub 60. In a subsequent evaluation, detailed contact areas between thread and hole 64 may be modeled, e.g., using height of the hole 64, the number of threads in contact with the material defining the hole 64. Solid mechanical structural modeling may be used, such as finite element analysis, to conduct as detailed of an assessment as desired.

The impact on the robot 30 may also be considered. For the robotic assembly 30, contact forces will introduce additional torque to each robotic joint. The effect is similar to a collision between the end effector 31 at the end of a robotic arm and the environment, i.e., the robot 30 will abruptly change the linear velocity of the end effector 31 at the contact point. Each joint will experience additional forces due to the external collision while the joint servo motors are applying emergency stop torques to stop the motion of the robot 30.

Due to the engaged assembly contact at the robot end of arm tool/end effector 31, each robot joint will experience additional torque due to the external collision force as follows:

$$A\Delta\vec{v}_r(t) = \vec{F}_r(t) \quad (2)$$

$$\Delta\vec{v} = J\Delta\vec{q}(t) \quad (3)$$

$$H\Delta\vec{q}(t) = \tau'(t) \quad (4)$$

$$\tau'(t) = HJ^T A^{-1} \vec{F}_r(t) \quad (5)$$

where $\vec{F}_r(t)$ is the external impulsive collision force applied at the end effector 31, $\Delta\vec{v}(t)$ is the abrupt linear speed change at the end effector 31, A is a 6×6 symmetric, positive-definite inertia matrix in the task (operational) space, J is a 6×n Jacobian matrix that is a function of robot mechanical links and their structure, $\Delta\vec{q}(t)$ is the abrupt joint speed change due to external impulsive collision force, H is an n×n symmetric, positive-definite generalized inertia matrix, and τ'(t) is the additional torque to compensate the abrupt joint motion.

Of equations (2)-(5) listed above, equation (2) is the linear speed change ($\Delta\vec{v}_r(t)$) of the end effector 31 under the impulsive impact force $\vec{F}_r(t)$ in the task (operational) space. Equation (3) is the classic Jacobian equation that relates joint speed and end effector speed. Equation (4) is the impulsive joint torque, τ'(t), that can overcome the abrupt joint speed change due to the impact. Equation (5) is the additional joint torques that should be applied to withstand the external impulsive impact force at the end effector 31.

On the robot side of work station 10, equation (5) demonstrates that the additional joint torques depend on the robot pose as well as the robotic mechanical link parameters expressed as the $HJ^T A^{-1}$ matrix. To minimize the environmental collision impact on the robot's joints, the matrix should be minimized. This means that some robot poses or joint positions can better withstand the impact than other poses. In a non-redundant six degree of freedom robot, the joint position is often chosen by the position of the product 16, e.g., a wheel and tire assembly location. Therefore, no other robot joint positions can be chosen to minimize the collision impact to all joint motors.

Figure 5:
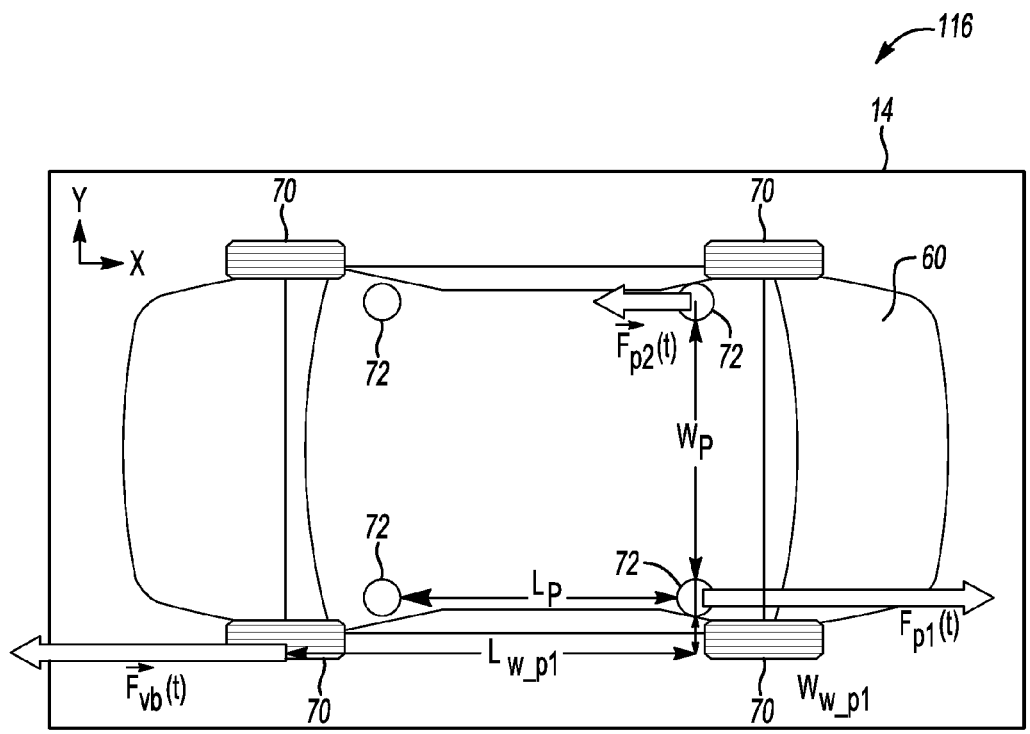
FIG. 5 is a schematic illustration of a vehicle describing desirable static equilibrium conditions with respect to a vehicle carrier.

Referring to FIG. 5, static equilibrium conditions are represented schematically for an example product 116 in the form of a vehicle. Some or all of the following evaluation may be performed via the modeling module 58 of FIG. 1. The impact of external force to the body 60 on the carrier 14 depends on three main factors: the overall dimensions of the vehicle and wheel base location, the weight and weight distribution of the vehicle, and the mechanisms used for locating and securing the vehicle on the carrier 14. Carrier pins 72 are typically used to carry the body 60 securely along the moving line 12 of FIG. 1. Holes or structure on the product 16 align with carrier pins 72 on the carrier 14. More or fewer carrier pins 72 may be used in a particular embodiment.

Holes (not shown) receiving the two front carrier pins 72 will endure the impulsive force due to the external collision with the end effector 31 at a wheel assembly 70 of FIG. 4 during an example e-stop event. When the body 60 is treated as a rigid body, the forces and torques have to be balanced in a static fashion in order for the body to maintain a stable position on the carrier 14. This is the static equilibrium condition for the body 60 to remain at the original holding position shown in FIG. 5.

Forces and torques may be balanced as follows:

$$\vec{F}_{vb}(t) \cdot \begin{bmatrix} L_{w\_p1} \\ W_{w\_p1} \\ H_{w\_p1} \end{bmatrix} = \vec{F}_{p2}(t) \cdot \begin{bmatrix} 0 \\ W_{pin} \end{bmatrix}$$

$$\vec{F}_{vb}(t) + \vec{F}_{p1}(t) + \vec{F}_{p2}(t) = 0$$

where $\vec{F}_{vb}(t)$ is the external impulsive collision force with the end effector 31 at the wheel assembly location; $\vec{F}_{p1}(t)$ is the internal impulsive reactive force at the location p1 in FIG. 5; $\vec{F}_{p2}(t)$ is the internal impulsive reactive force at the pin 2 location; $L_{w\_p1}$ is the distance from the robot 30 (see FIG. 1) to the first pin location p1 in the X direction of the body 60; $W_{w\_p1}$ is the distance from the robot 30 to the first pin location p1 along the Y direction of the body; $H_{w\_p1}$ is the distance from the robot 30 to the first pin location p1 in the Z direction of the body 60 (i.e., the vertical axis of the body 60 perpendicular to the X and Y axes shown in FIGS. 5 and 6); and $W_P$ is the distance between the two front carrier pins 72 along the Y direction of the body 60.

Assuming both front carrier pins 72 can withstand peak contact forces with no damage to the mating hole structures, vehicle body equilibrium is stable when the height of the wheel assembly 70 is at the samer height as the pins 72, i.e., $H_{w\_p1}=0$. There is no risk of the product 116 being tipped or knocked over when all forces are on a single horizontal plane. When $H_{w\_p1}>0$, i.e., the contact height exceeds the pivot pin height, the equilibrium is still stable if the center of gravity of the product 116 is higher than the assembly contact height. FIG. 5 thus illustrates the type of analysis that may be applied by the modeling module 58 to the equilibrium state of product 116 in evaluating the effects of a given contact force, which in one embodiment may be modeled or estimated by the modeling module 58 as noted above.

Figure 6:
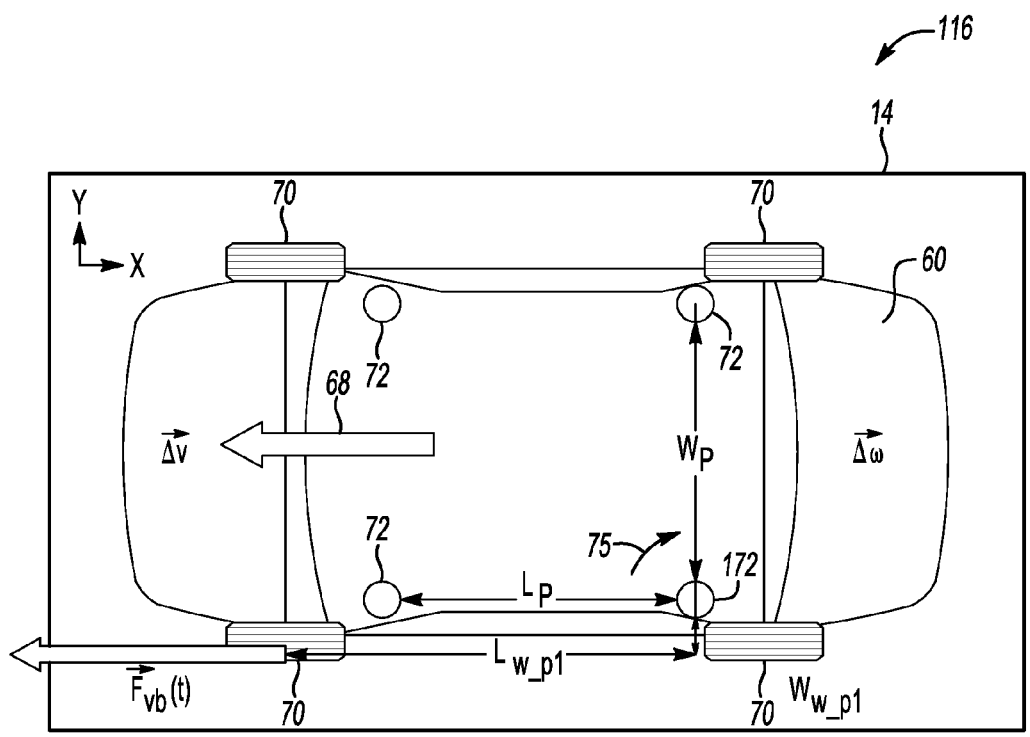
FIG. 6 is a schematic illustration of potential body motion of the vehicle shown in FIG. 4.

Referring to FIG. 6, vehicle body motion may also be considered when one of the front carrier pins 172 is a center of rotation, as indicated by arrow 75. Classical mechanics may be used, in particular the principles of conservation of angular momentum and linear momentum. The external impulsive collision force, $\vec{F}_{vb}(t)$ will cause an abrupt linear speed change as well as rotational acceleration of the body 116 with respect to carrier pin 172. Such abrupt motion will result in a small linear travel or rigid body rotation to cover the dimensional tolerane between carrier pin and underbody hole until motion is constrained by the edges of the hole. In other words, the dimensional tolerance is the free motion space for the body after the collision, since the vehicle jerks ahead and rotates about a front carrier pin 172.

Furthermore, the collision force is on the same plane as the carrier pins 72, 172. Thus, the analysis can be simplified to a planar collision problem. The impulsive dynamics will follow the classical equations of linear and angular momentum for rigid body motion as follows:

$$\int_{\Delta t} \vec{F}_{vb}(t) dt = M \cdot \Delta \vec{v}$$

$$\int_{\Delta t} \vec{\tau}_{vb}(t) dt = I_{pin} \cdot \Delta \vec{\omega}$$

Where $\vec{F}_{vb}(t)$ is the external impulsive collision force with the end effector 31 at the location of the wheel assembly 70, $\vec{\tau}_{vb}(t)$ is the external impulsive collision force with respect to one of the front pins, M is the vehicle body mass, $\Delta \vec{v}$ is the translational velocity change of body 60 from the initial zero speed, $I_{pin}$ is the moment of inertia of the body 60 about carrier pin 172, and $\Delta \vec{\omega}$ is the angular velocity change of body 60 from the initial zero speed.

Thus, a given impact force may be evaluated with respect to its actual deformation and/or displacement of a given component of the product 16 of FIG. 1, such as the example wheel hub 60 of FIG. 4, as well as on the motion of the product with respect to the carrier 14 as explained above with reference to product 116 of FIGS. 5 and 6. Control of the deceleration of the assembly robot 30 (FIG. 1) in the manner set forth in detail above may help to reduce the peak impact force, and example trace of which is shown in FIG. 2, and thus the area under the curve defining the impact force spike 48 as shown in the same Figure.

The optional modeling module 58 of FIG. 1 may be used in some embodiments to evaluate, e.g., static equilibrium and/or rotation of the product 16 and its embodiments with respect to the carrier 14 of FIG. 1 as noted above using estimated and/or measured contact forces, the structural integrity of the product 16 when acted on by such contact forces, etc. In such an embodiment, the various equations set forth above with reference to FIGS. 4 and 5 may be solved using the controller 50, in conjunction with modeled/estimated contact forces or actual/measured contact forces. Collectively, the present approach may help protect the product 16 and the robot 30 during an e-stop event occurring in the contact phase of assembly.

While the best modes for carrying out the invention have been described in detail, those familiar with the art to which this disclosure relates will recognize various alternative designs and embodiments for practicing the invention within the scope of the appended claims.

The invention claimed is:
1. A system for use in a work cell having a carrier that moves a product along an assembly line, the system comprising:

an assembly robot having a robotic arm, a platform which transports the robotic arm, and a motor for moving the platform;
a tracking sensor positioned with respect to the carrier that measures a changing position of the carrier and encodes the changing position as a position signal; and
a controller in communication with the assembly robot and the tracking sensor;
wherein the controller is configured to:
receive the position signal from the tracking sensor;
calculate a lag value of the assembly robot with respect to the carrier as a function of the position signal;
detect a requested emergency stop (e-stop) event of the assembly robot when the arm and the product are in mutual contact; and
selectively transmit a speed signal to the motor only when the calculated tracking position lag value is above a calibrated threshold, wherein the speed signal causes a calibrated deceleration of the platform to occur which minimizes contact forces between the robotic arm and the product during the e-stop event.

2. The system of claim 1, wherein the motor is positioned with respect to a rail adjacent to the assembly line, and wherein the speed signal causes a calibrated braking of the rail motor with respect to the rail.

3. The system of claim 1, wherein the tracking sensor includes an electro-optical tracking camera.

4. The system of claim 1, wherein the controller calculates an average speed of the conveyor as a function of the position signal, and moves the platform at the calculated average speed via the motor whenever the e-stop event is not requested.

5. The system of claim 4, wherein the controller calculates an instantaneous speed adjustment value for an end-effector of the robotic arm when the e-stop event is not requested, and transmits the calculated speed adjustment value to the end-effector to maintain a calibrated alignment between the end-effector and the product.

6. The system of claim 1, wherein the controller includes a modeling module that models forces on the product during the e-stop event, and that estimates contact forces on the product during the modeled e-stop event, and wherein the controller is configured to determine parameters of the speed signal using the estimated contact forces.

7. The system of claim 6, wherein the modeling module models the effect on static equilibrium of the product with respect to the carrier using the estimated contact forces.

8. The system of claim 6, wherein the modeling module models the effect on rotation of the product with respect to a pin of the carrier using the estimated contact forces.

9. The system of claim 6, wherein the modeling module models the effect on the structural integrity of contact with the product using the estimated contact forces.

10. A method for use in a work cell having a carrier that moves a product along an assembly line, the method comprising:
moving a robotic arm of an assembly robot on a moveable platform that is positioned adjacent to the carrier;
measuring a changing position of the carrier using a tracking sensor;
encoding the changing position as a position signal;
transmitting the position signal to a controller;
calculating a lag value of the assembly robot via the controller with respect to the carrier as a function of the position signal;
detecting a requested emergency stop (e-stop) event of the assembly robot when the arm and the product are in mutual contact; and
selectively transmitting a speed signal from the controller to a motor of the assembly robot only when the calculated tracking position lag value is above a calibrated threshold, wherein the speed signal causes a calibrated deceleration of the platform to occur via the motor, thereby minimizing contact forces between the robot arm and the product during the e-stop event.

11. The method of claim 10, wherein the platform is positioned with respect to a rail and is moveable on the rail using the motor, and wherein selectively transmitting a speed signal includes commanding a calibrated deceleration of the platform via a braking action of the motor with respect to the rail.

12. The method of claim 10, wherein the tracking sensor includes an electro-optical tracking camera, and wherein measuring a changing position of the carrier includes recording digital images of the product using the camera.

13. The method of claim 10, further comprising:
calculating an average speed of the conveyor, via the controller, as a function of the position signal; and
moving the platform at the calculated average speed via the controller whenever the e-stop event is not requested.

14. The method of claim 10, further comprising:
calculating an instantaneous speed adjustment value for an end-effector of the robotic arm when the e-stop event is no longer requested; and
transmitting the calculated speed adjustment value to the end-effector to maintain alignment between the end-effector and the product.

15. The method of claim 10, further comprising:
modeling the e-stop event via the controller;
estimating contact forces on the product during the modeled e-stop event; and
determining parameters of the speed signal using the estimated contact forces.

16. The method of claim 10, further comprising using the controller to evaluate the effect on at least one of static equilibrium of the product with respect to the carrier, rotation of the product with respect to a pin of the carrier, and the structural integrity of the product using the estimated contact forces.

17. A system for use in a work cell having a carrier that moves a product along an assembly line, the system comprising:
an assembly robot having a robotic arm, a platform that transports the robotic arm, and a rail motor that propels the platform on a rail adjacent to the assembly line in a synchronous manner with respect to motion of the carrier;
an electro-optical tracking camera positioned with respect to the carrier that electro-optically images the carrier as the carrier moves the product; and
a controller in communication with the assembly robot and the camera;
wherein the controller is configured to:
receive a position signal from the tracking camera describing the changing position of the carrier;
calculate an average speed of the carrier using the position signal;
calculate a lag value of the platform with respect to the carrier using the position signal;
detect a requested emergency stop (e-stop) event of the carrier when the arm and the vehicle component are in mutual contact;

selectively transmit a first speed signal to the rail motor to cause a calibrated deceleration of the platform to occur only when the calculated tracking position lag value is above a calibrated threshold, thereby minimizing contact forces between the robot arm and the product during the e-stop event; and selectively transmit a second speed signal to the rail motor to move the platform at an average speed of the carrier when the calculated tracking position lag value is below the calibrated threshold.

18. The system of claim 17, wherein the controller calculates an instantaneous speed adjustment value for an end-effector of the robotic arm when the e-stop event is no longer requested, and transmits the calculated speed adjustment value to the end-effector to maintain a predetermined alignment between the end-effector and the product.

19. The system of claim 17, wherein the controller is configured to record a contact force, and to automatically calculate and evaluate the effect on at least one of static equilibrium of the product with respect to the carrier, rotation of the product with respect to the carrier, and structural integrity of the product, using the recorded contact forces.

* * * * *